United States Patent [19]

Lipsztajn

[11] Patent Number: 4,704,259

[45] Date of Patent: Nov. 3, 1987

[54] REMOVAL OF CHROMIUM FROM CELL LIQUOR

[75] Inventor: Marek Lipsztajn, Rexdale, Canada

[73] Assignee: Tenneco Canada Inc., Islington, Canada

[21] Appl. No.: 866,726

[22] Filed: May 27, 1986

[51] Int. Cl.$^4$ ............................................. C01G 37/02
[52] U.S. Cl. ........................................ 423/55; 423/54; 423/597; 423/607; 204/89; 204/97
[58] Field of Search .................. 423/54, 55, 475, 597, 423/607; 204/89, 97

[56] References Cited

U.S. PATENT DOCUMENTS

| | | | |
|---|---|---|---|
| 3,843,769 | 10/1974 | Partridge et al. | 423/475 |
| 3,961,029 | 6/1976 | Senoo | 423/55 |
| 4,086,150 | 4/1978 | Kindl et al. | 423/607 |
| 4,259,297 | 3/1981 | Kaczur et al. | 423/55 |
| 4,268,486 | 5/1981 | Noack et al. | 423/55 |
| 4,401,573 | 8/1983 | Perrone et al. | 423/55 |

FOREIGN PATENT DOCUMENTS 1139080  1/1983  Canada .
3032131  of 0000  Fed. Rep. of Germany ...... 423/475
5119493  9/1980  Japan .................................... 423/55

*Primary Examiner*—Patrick P. Garvin
*Assistant Examiner*—Paige C. Harvey
*Attorney, Agent, or Firm*—Sim & McBurney

[57] ABSTRACT

Soluble hexavalent chromium values are removed from aqueous chlorate solutions by employing a critical effective ratio of $OH^-:Cr_2O_7^=$ ions of at least 3:1 in the aqueous chlorate solution and by employing a dithionite to reduce the hexavalent chromium to trivalent chromium, preferably in the mole ratio of $S_2O_4^=:Cr_2O_7^=$ of at least 3:1. The trivalent chromium forms chromic hydroxide ($Cr(OH)_3$) with the hydroxyl ions and precipitates from the aqueous chlorate solution. The process is rapid and effective in quantitative removal of hexavalent chromium from the aqueous chlorate solutions and is especially useful for the removal of sodium dichromate from cell liquor which is intended to be employed in chlorine dioxide production and which is produced by diaphragmless electrolysis of sodium chloride.

41 Claims, No Drawings

REMOVAL OF CHROMIUM FROM CELL LIQUOR

FIELD OF INVENTION

The present invention relates to the removal of chromium in the form of chromate from electrolytically-produced aqueous chlorate solutions.

BACKGROUND TO THE INVENTION

An aqueous solution of sodium chlorate and sodium chloride is conventionally produced by the electrolysis of aqueous sodium chloride in diaphragmless electrolytic cells. The extent of electrolysis is controlled to produce an effluent from the cell in which the sodium chlorate and sodium chloride have the desired ratio, usually in the range of about 1:1 to about 20:1 and preferably in the range of about 2:1 to about 15:1. The aqueous solution may be further processed to crystallize out the sodium chlorate for sale in crystal form for a variety of purposes, for example, in the production of chlorine dioxide for use in the bleaching of chemical cellulosic pulps, by reduction in the presence of a strong mineral acid, usually sulphuric acid, or aqueous solution may be used directly for that purpose.

In the electrolysis of sodium chloride to form sodium chlorate, it is conventional to add chromates, usually in the form of sodium dichromate, to the electrolyte in the cell to improve significantly the current efficiency of the cells in the conversion of sodium chloride to sodium chlorate. The cell effluent, also known as "cell liquor", therefore, generally contains significant amounts of chromate ion.

It is desirable to remove chromate ion from the cell effluent before employment of the same in chlorine dioxide generation and it is desirable to recover the chromate ion for reuse in the electrolytic cells. In addition, chromate ions are a toxic pollutant, so that environmental considerations require removal of the chromate ions where discharge of an effluent stream containing such ions may be effected. A number of prior proposals have been made for the removal of chromate ion from cell liquor.

In U.S. Pat. No. 3,961,029, it is disclosed that chromate ions can be recovered from an aqueous waste liquor by employing, in a first step, a reducing agent, such as sodium hydrogen sulfite, at an acid pH and precipitating the chromium values as chromium hydroxide at an alkaline pH. U.S. Pat. No. 3,981,965 discloses a method of treating solid waste material containing minor amounts of water-soluble chromium compounds with, among others, sodium dithionite. In neither of these pieces of prior art is there any teaching of the applicability of either procedure to highly concentrated aqueous alkali metal chlorate solutions.

U.S. Pat. No. 3,843,769 teaches a process whereby alkali metal chlorate solutions containing hexavalent chromium are treated with at least a 3-molar proportion of a water-soluble sulfide, such as sodium sulfide, sodium bisulfide, potassium bisulfide or hydrogen sulfide. The solution then is acidified to a pH below about 5, whereby the trivalent chromium is precipitated as an insoluble product, and removed from the solution. In addition to producing trivalent chromium precipitate, elemental sulfur is also precipitated. Further, the cell liquor contains dissolved sulphide ions, which is detrimental in chlorine dioxide production, since the acid medium would tend to form $H_2S$ from the sulfide ions, which then would react violently with the already-unstable chlorine dioxide. In addition, the pH adjustments required to be effected consume large quantities of chemicals and require large capital expenditures.

The problem of elemental sulfur coprecipitation is overcome by the proposal in U.S. Pat. No. 4,268,486 to use hydrazine to reduce $Cr^{VI}$ to $Cr^{III}$ but the problems of undesirable reaction with $ClO_2$ and pH adjustment remain. An additional drawback of this process is that, if the reaction is not carried out quickly enough at the correct pH, then the hydrazine or hydrazine salt is consumed by reaction with the chlorate instead of the $Cr^{VI}$. Hydrazine is also suggested as a suitable reducing agent in Canadian Pat. No. 1,139,080. A similar process, described in German O.S. No. 3,032,131 discloses hydroxylamine hydrochloride as a reductant but again the same deficiencies exist.

Finally, U.S. Pat. No. 4,259,297 describes a process for the removal of hexavalent chromium from alkali metal chlorate solutions by reaction with, inter alia, alkali metal and alkaline earth metal sulfites, bisulfites and dithionites. In this process, an initial pH adjustment to the range of about 9 to about 13 is effected, the reductant is added to form an aqueous slurry of solid particles of trivalent and divalent chromium compounds, the pH of the slurry is adjusted to a value of about 2 to about 4, the pH of the slurry is again adjusted to a value of about 6 to about 8, and the solid particles are removed from the aqueous solution.

The use of low pH's in the range of about 2 to about 4, as required in this prior art, may lead to chlorine dioxide formation from the chlorate cell liquor, which is very hazardous. In addition, no method is provided for the removal of excess reductant and losses of sodium chlorate occur.

There exists, therefore, a need for an effective method of removal of hexavalent chromium from cell liquor which is not attended by the drawbacks inherent in the prior art procedures, as described above.

SUMMARY OF INVENTION

It has now surprisingly been found that hexavalent chromium may be rapidly and efficiently removed from cell liquor by the formation and precipitation of $Cr^{III}$ as $Cr(OH)_3$ by reduction of hexavalent chromium with a dithionite under certain specific and novel conditions. In particular, it has been found that, in the presence of a minimum effective mole ratio of $OH^-:Cr_2O_7^=$ of about 3:1, substantially quantitative conversion of $Cr^{VI}$ to $Cr^{III}$ is effected by reaction with a dithionite and the $Cr^{III}$ precipitates quantitatively as $Cr(OH)_3$, without any necessity for pH adjustment nor any necessity for the presence of residual reductant.

In accordance with the present invention, therefore, there is provided a method for the removal of hexavalent chromium from an aqueous chlorate solution, preferably cell liquor, as a trivalent chromium hydroxide precipitate, which comprises (a) adding to the aqueous chlorate solution at least sufficient hydroxyl ions, usually in the form of sodium hydroxide, to provide alkaline pH conditions and to permit trivalent chromium to form $Cr(OH)_3$; (b) adding a dithionite, usually sodium dithionite, to the aqueous chlorate solution to reduce hexavalent chromium to trivalent chromium under the alkaline pH conditions and to cause precipitation of $Cr(OH)_3$, and (c) separating the precipitated $Cr(OH)_3$ from the aqueous chlorate solution.

GENERAL DESCRIPTION OF INVENTION AND DESCRIPTION OF PREFERRED EMBODIMENTS

Although the invention is described mainly with respect to the removal of chromium values from sodium chlorate solutions containing unreacted sodium chloride, since these are the chromium-containing solutions most commonly encountered and hence the ones to which the present invention has greatest applicability, the present invention has broad application to the removal of reducible hexavalent chromium from any aqueous chlorate solution. Such aqueous chlorate solutions include aqueous solutions of alkali metal chlorates, such as sodium chlorate, potassium chlorate, lithium chlorate, rubidium chlorate and cesium chlorate, alkaline earth metal chlorates, such as beryllium chlorate, magnesium chlorate, calcium chlorate, strontium chlorate, barium chlorate and radium chlorate, and mixtures of two or more such chlorates, which may also contain dissolved quantities of alkali metal chlorides, alkaline earth metal chlorides and mixtures thereof.

The present invention uses a dithionite to reduce the hexavalent chromium to trivalent chromium in the presence of sufficient hydroxyl ions to ensure formation of $Cr(OH)_3$ from the trivalent chromium produced in the reduction. The presence of a critical effective mole ratio of $OH^-:Cr_2O_7^=$ of at least about 3:1 results in quantitative recovery of $Cr^{III}$ as precipitated $Cr(OH)_3$ upon reduction of hexavalent chromium with dithionite.

The effective mole ratio of $OH^-:Cr_2O_7^=$ is preferably less than about 6:1, to avoid amphoteric dissolution of the $Cr^{III}$. The preferred mole ratio range is about 3 to about 5, more particularly about 3.5:1. The hydroxyl ions in the required mole ratio are introduced to the aqueous sodium chlorate solution in the form of any convenient hydroxide. Usually, sodium hydroxide is employed, in view of the ready availability of this chemical, although other hydroxides, such as potassium hydroxide may be employed. Such sodium hydroxide usually is introduced as an aqueous solution of sodium hydroxide, which may have a concentration ranging from about 5 to about 75 percent by weight.

As noted above, the present invention requires an effective mole ratio of $OH^-:Cr_2O_7^=$ of at least 3:1. By "effective mole ratio" is meant that the mole ratio is that present in the aqueous phase. Under circumstances where the starting liquor is at an acidic pH, some of the hydroxyl ions added to the sodium chlorate solution are consumed in neutralizing the acidity. The necessity first to effect such neutralizing must be taken into account when determining the amount of sodium hydroxide or other source of hydroxide ions needed to be added to the sodium chlorate solution or other chlorate solution to provide the desired minimum effective mole ratio of $OH^-:Cr_2O_7^=$ of at least 3:1. At a starting pH of chlorate solution of about 6 to 7, the moles of hydroxyl ions added per mole of dichromate ions correspond to the effective solution mole ratio of $OH^-:Cr_2O_7^=$.

The dithionite which is employed to reduce the hexavalent chromium may be any desirable dithionite, usually sodium dithionite but also including other alkali metal dithionites, such as potassium dithionite and lithium dithionite, and alkaline earth metal dithionites, such as calcium dithionite, magnesium dithionite, as well as mixtures of two or more such dithionites.

The dithionite stoichiometrically reduces the hexavalent chromium to trivalent chromium and hence the proportion of the hexavalent chromium which is reduced to trivalent chromium by the dithionite is dependent on the mole ratio of dithionite ($S_2O_4^=$) to dichromate ($Cr_2O_7^=$) up to a mole ratio of 3.0:1, whereat complete conversion of hexavalent chromium to trivalent chromium occurs. Usually, the process of the invention is operated at a mole ratio of $S_2O_4^=:Cr_2O_7^=$ of at least about 3:1 to ensure stoichiometrically complete reduction of all the hexavalent chromium originally present in the original sodium chlorate solution. However, if it is desired to retain some of the initial hexavalent chromium in the final solution, a mole ratio of $S_2O_4^=:Cr_2O_7^=$ less than 3.0:1 may be employed, for example about 2.8:1.

As the hexavalent chromium ions are reduced to trivalent chromium by the dithionite, the trivalent chromium ions react with the hydroxyl ions present in the aqueous phase and form insoluble chromium hydroxide ($Cr(OH)_3$) which precipitates from the sodium chlorate solution. The reduction of the hexavalent chromium by the dithionite is very rapid, as is the reaction between the trivalent chromium and the hydroxyl ions, so that the rate-determining step becomes the sedimentation of the insoluble chromium hydroxide, which generally possesses a colloidal character. The sedimentation rate can be increased by using an elevated temperature, but elevated temperature does not significantly affect the rate of the reactions. Sedimentation is best effected at a final pH of about 8 to 9. The sedimentation rate also may be enhanced by centrifugation.

It should be noted that a key finding on which this invention is based is that the effectiveness of $Cr^{III}$ precipitation depends on the effective mole ratio of $OH^-:Cr_2O_7^=$, rather than on pH. A minimum molar ratio of about 3:1, preferably about 3.5:1, is required. This fact may explain why no pH adjustment other than the initial NaOH addition is necessary in this invention, whereas in U.S. Pat. No. 4,259,297 it was necessary to adjust the pH to acid levels to achieve chromium hydroxide precipitation.

A significant excess of dithionite is generally avoided, so as to minimize the presence of residual unreacted dithionite in the chromium-depleted sodium chlorate solution, which may adversely affect a chlorine dioxide-generating process in which the sodium chlorate solution is to be employed. In addition, the reduction of $Cr^{VI}$ to $Cr^{III}$ using dithionites in the process of the invention produces a corresponding quantity of sulfite ions. Sulfite ion concentrations in excess of 0.5 gpl are detrimental to efficient chlorine dioxide production and, when the sodium chlorate solution is to be used for that purpose, desirably should be removed. Accordingly, it is preferred to oxidize any sulfite ions and residual unreacted dithionite present in the product sodium chlorate solution to harmless sulfate ions by using any convenient oxidant, for example, by bubbling air or oxygen through the sodium chlorate solution, before or after removal of the precipitated chromium hydroxide.

It is preferred to add the dithionite in the form of powder, since aqueous solutions of dithionites tend to be unstable and the use of the solid thereby ensures that the required effective amount of the dithionite is introduced to the sodium chlorate solution. The dithionite may be formed in situ, if desired, from gaseous sulfur dioxide.

The reduction of hexavalent chromium to trivalent chromium by dithionite occurs irrespective of the presence of the hydroxyl ion. The presence of the hydroxyl ions in the aqueous phase, however, ensures that the trivalent chromium which forms upon reduction precipitates as chromic hydroxide (Cr(OH)$_3$). Critical to obtaining complete rapid precipitation of the trivalent chromium as chromium hydroxide is the use of an effective mole ratio of OH$^-$:Cr$_2$O$_7$$^=$ of at least about 3:1. At mole ratios below this value, even with less than stoichiometric conversion of hexavalent chromium to trivalent chromium, precipitation of the trivalent chromium is incomplete, although prolonged storage may lead to more complete precipitation, but such storage is impractical in a pulp mill environment where the sodium chlorate usually is required on a continuous basis.

In principle, the addition of sodium hydroxide and sodium dithionite to the sodium chlorate solution may be effected simultaneously. However, the stability of Na$_2$S$_2$O$_4$ in aqueous solution in contact with air is very low and a significant loss of reagent occurs, if the sodium dithionite is included in the sodium hydroxide solution, especially at elevated temperatures. In addition, the solubility of sodium dithionite in water is rather low. It is preferred, therefore, to carry out the additions of sodium hydroxide and sodium dithionite sequentially, with the sodium dithionite being added as a powdered solid and being quickly stirred into the aqueous medium following initial adjustment of the OH$^-$:Cr$_2$O$_7$$^=$ mole ratio with added hydroxyl ions.

The process of the present invention avoids the difficulties of the prior art processes as discussed above. Thus, the use of dithionite is rapid and effective in reducing the hexavalent chromium to trivalent chromium, whereas other reducing agents, for example, sulfites, thiosulphates and sulfides are significantly slower or ineffective in alkaline pH medium, and hence are excluded from the present invention. By employing a specific mole ratio of hydroxyl ion to dichromate ion, quantitative precipitation of the chromium as chromic hydroxide (Cr(OH)$_3$) is achieved, without the necessity of shifting pH values and without risking chlorine dioxide production under acidic conditions.

The invention has particular application to the treatment of aqueous solutions of sodium chlorate and sodium chloride produced by electrolysis of aqueous sodium chloride solution. As mentioned earlier, such solutions are commonly termed "cell liquor". The concentration of sodium chlorate and of sodium chloride in cell liquor may vary widely, depending on the extent of electrolysis of the initial sodium chloride solution. Generally, the concentration of sodium chlorate present may vary from about 100 to about 750 gpl, preferably about 250 to about 675 gpl, and the concentration of sodium chloride present may vary from about 20 to about 400 gpl, preferably about 50 to about 300 gpl. Typically, cell liquor contains about 600 gpl of sodium chlorate and about 100 gpl of sodium chloride.

The hexavalent chromium present in the aqueous solution of sodium chlorate and sodium chloride, or other aqueous chlorate solution, is usually added to the electrolyte in the form of sodium dichromate in an amount sufficient to provide a hexavalent chromium concentration in the range of about 0.1 to about 20.0 grams of sodium dichromate per liter of solution, preferably about 0.2 to about 10.0 gpl, typically about 2 gpl.

Although the hexavalent chromium is usually added to the aqueous chloride electrolyte solution in the form of sodium dichromate (Na$_2$Cr$_2$O$_7$), other forms of water-soluble hexavalent chromium may be employed, for example, sodium chromate (Na$_2$CrO$_4$), chromic acid (CrO$_3$), potassium dichromate (K$_2$Cr$_2$O$_7$), potassium chromate (K$_2$CrO$_4$) and mixtures of two or more of such materials may be employed.

Where the hexavalent chromium is present in the chlorate solution other than as dichromate ions, for example, as CrO$_4$$^=$, the mole ratio of OH$^-$:Cr$_2$O$_7$$^=$ upon addition of hydroxide ions is determined on a chromium equivalent basis.

In the process of the invention, the hexavalent chromium values are removed from the aqueous chlorate solution in the form of trivalent chromium hydroxide. The trivalent chromium hydroxide may be sold as such or may be oxidized back to the hexavalent state for reuse in the electrolyte process for producing sodium chlorate. Where the trivalent chromium hydroxide is to be reoxidized to the Cr$^{VI}$ state for recycle to the electrolysis process, residual sodium chlorate may be retained in the solids. Where, however, the trivalent chromium hydroxide is to be disposed of by sale or otherwise, residual sodium chlorate is first removed by suitable washing of the precipitate.

Based on experiments which have been conducted relating to the present invention, the results of which are reported in the specific Examples below, a presently most preferred manner of carrying out the present invention has been determined and is characterized by the following steps:

(a) determining the sodium dichromate content of the cell liquor by any suitable procedure, such as VIS spectrophotometry;

(b) adding sodium hydroxide solution to the cell liquor to provide an effective mole ratio of NaOH:Na$_2$Cr$_2$O$_7$ of at least 3:1, typically resulting in a pH of about 12;

(c) adding solid powdered sodium dithionite to the pH adjusted cell liquor in the stoichiometric mole ratio of Na$_2$S$_2$O$_4$:Na$_2$Cr$_2$O$_7$ of at least 3:1;

(d) stirring in the sodium dithionite to form a blue-green precipitate with the consumption of hydroxyl ions resulting in a pH in the range of about 8 to 9;

(e) centrifuging the solution to sediment the Cr(OH)$_3$; and (f) separating the sedimented Cr(OH)$_3$ from the mother liquor.

An additional step which preferably is employed in this sequence but also which may be omitted, if desired, is that of:

(g) bubbling air or oxygen through the solution for about 10 to 20 minutes to convert sulfite ions and residual dithionite ions to sulfate ions.

This oxidation step may be effective before or after centrifugation of the solution to sediment and the Cr(OH)$_3$.

The process of the invention achieves rapid and effective removal of hexavalent chromium from cell liquor and other aqueous chlorate solutions by conversion to insoluble trivalent chromium hydroxide, in a manner which does not require significant pH changes and which is safe, in that the potential for chlorine dioxide production from the chlorate during the chromium removal process is avoided.

EXAMPLES

Example 1

A series of experiments was carried out involving treatment of synthetic cell liquor containing 550 to 590 gpl NaClO$_3$, 50 to 100 gpl NaCl and 1.5 to 5 gpl Na$_2$C-

$r_2O_7 \cdot 2H_2O$. Cell liquor sample volumes were typically 100 ml. The temperature was varied between 25° and 60° C. In all instances, the pH of the simulated cell liquor first was adjusted using sodium hydroxide solution, powdered sodium dithionite then was added with stirring, and the resulting precipitate was removed by filtration or centrifugation. Precipitate and solution phase colors were observed.

The hexavalent chromium content of the simulated liquor was determined both before and after the precipitation of chromium hydroxide. The residual total chromium content of the aqueous phase after separation of precipitated chromium hydroxide also was determined.

The concentrations of sodium chlorate and sodium chloride were determined following removal of the precipitate from the treated liquor.

The pH of the solution was adjusted using appropriate amounts of 1N NaOH. Anhydrous sodium dithionite (purified grade from Fisher Scientific) containing about 70% $Na_2S_2O_4$ (bases on titration with potassium ferricyanide) was used as the reducing agent following pH adjustment. The concentration of $Cr^{VI}$ was determined by means of VIS spectrophotometry, while for the total Cr content, Atomic Absorption spectrophotometry was used. Filtering processes were done using a Millipore filter apparatus (0.45 μm filter) and centrifuging of chromium hydroxide precipitate was performed on a Fisher Centrific Centrifuge Model 225.

The results of the experiments performed are set forth in the following Tables IA and IB:

of the added hydroxide ions were used to neutralize the acid.

At a molar ratio of 3 $Na_2S_2O_4$:1 $Na_2Cr_2O_7$, reaction was very fast and was practically complete in a few minutes. No significant change in concentrations of chlorates and chlorides was observed. Some experiments were run at molar ratios less than 3:1 and, in such cases, an excess of $Na_2Cr_2O_7$ remained unreacted.

Even though reduction of hexavalent chromium to trivalent chromium was complete at the molar ratio of 3 $Na_2S_2O_4$:1 $Na_2Cr_2O_7$, it was only when sodium hydroxide was initially added to provide a molar ratio of NaOH:$Na_2Cr_2O_7$ of at least 3:1 that the trivalent chromium precipitated as $Cr(OH)_3$ and complete removal of soluble chromium values from the simulated cell liquor occurred. In this regard, compare, e.g. experiment 2 with experiment 9.

Example 2

The reduction of $Cr^{VI}$ to $Cr^{III}$ using sodium dithionite produces a corresponding amount of sulfites. Air was bubbled through a typical filtrate produced by the procedure of the invention as described in Example 1, following removal of precipitated chromium hydroxide. The air was bubbled through for up to 10 minutes and the concentration of residual sulfite was determined at time intervals during this period.

The results obtained are set forth in the following Table II:

TABLE IA

REMOVAL OF $Na_2Cr_2O_7$ FROM CELL LIQUOR BY $Na_2S_2O_4$

| NO. OF EXP. | TEMP OF SOL'N (°C.) | INITIAL $Na_2Cr_2O_7$ (g/l) | ADD $Na_2S_2O_4$ MOLE RATIO $Na_2S_2O_4$/$Na_2Cr_2O_7$ | ADD NaOH/ MOLE RATIO NaOH/$Na_2Cr_2O_7$ | pH INITIAL | ADD NaOH | ADD $Na_2S_2O_4$ | AFTER 15 MIN |
|---|---|---|---|---|---|---|---|---|
| 1 | 25 | 3.00 | 2.5:1 | 1.1:1 | 6.0 | — | — | 7.5 |
| 2 | 25 | 3.00 | 3.0:1 | 1.1:1 | 6.0 | — | 7.5 | 7.2 |
| 3 | 25 | 3.00 | 2.8:1 | 2.5:1 | 6.0 | — | — | — |
| 4 | 65 | 3.00 | 2.5:1 | 2:1 | 6.2 | 10.6 | — | 7.8 |
| 5 | 65 | 3.00 | 2.0:1 | 2:1 | 6.2 | 10.9 | — | 7.9 |
| 6 | 25 | 4.98 | 3:1 | 3.6:1 | 3.9 | 11.9 | 8.6 | 8.3 |
| 7 | 25 | 4.98 | 3:1 | 4.8:1 | 3.9 | 12.0 | 9.5 | 9.3 |
| 8 | 50 | 4.98 | 3:1 | 4.2:1 | 3.9 | 11.3 | 8.3 | 8.0 |
| 9 | 25 | 3.00 | 3:1 | 3:1 | 6.0 | 12.0 | — | 8.0 |

Notes:
1. "—" means no value is available
2. For pH adjustment, 1N NaOH used
3. For the concentration of above substances, some values were corrected according to the dilution factor.

TABLE IB

| NO. OF EXP. | COLOUR AT THE END OF STIRRING | COLOUR OF SOL'N AFTER CENTRI- FUGING | FILTRATE BY 0.45 um MILLIPORE | CONC. OF $Na_2Cr_2O_7$ AT THE END (mg/L) AS ONLY $Na_2Cr_2O_7$ | AS TOTAL Cr VI, Cr III | g/L $NaClO_3$ INITIAL | AT THE END OF EXP. | g/L NaCl INITIAL | AT END OF EXP. |
|---|---|---|---|---|---|---|---|---|---|
| 1 | green | green | — | 300 | 690 | | | | |
| 2 | blue green | blue green | — | 10 | 802 | | | | |
| 3 | blue green | sl.g.yellow | — | 70 | 89 | | | | |
| 4 | green | green | yellow | 300 | 315 | | | | |
| 5 | green | green | yellow | 860 | 946 | | | | |
| 6 | blue green | colourless | — | 0 | 0 | 583 | 587 | 96 | 97 |
| 7 | deep bl gr. | colourless | — | 0 | 0 | | | | |
| 8 | blue green | sl colour | colourless | 0 | 0 | 550 | 561 | 96 | 102 |
| 9 | blue green | — | colourless | 0 | 0 | 572 | 581 | 70 | 70 |

In Tables IA and IB, the mole ratios reported are based upon the actual quantity of sodium dichromate present and the actual amounts of sodium hydroxide and sodium dithionite added. In instances where the sodium chlorate solution had considerable acidity, some

TABLE II

| DURATION OF BUBBLING [min] | CONCENTRATION OF $SO_3^{2-}$ (millimole/L) | pH |
|---|---|---|
| 0 | 1.033 | 9.0 |
| 1 | 0.998 | — |

TABLE II-continued

| DURATION OF BUBBLING [min] | CONCENTRATION OF $SO_3^{2-}$ (millimole/L) | pH |
|---|---|---|
| 5 | 0.082 | — |
| 10 | 0.012 | 7.1 |

Dithionite ion is preferentially oxidized in comparison to sulfite ions. Monitoring the residual sulfite, therefore, provides a reliable indication as to any residual dithionite which may be present. As may be seen from the results of Table II, bubbling of air through the filtrate effectively removed substantially all of the sulfite ion, and hence substantially all the unreacted dithionite, and converted them to sulfate ion. At the same time, the pH of the filtrate falls from about 8 to about 7, so that no further pH adjustment to neutrality is required.

Example 3

Both filtration and centrifugation were tested as methods of achieving separation of $Cr(OH)_3$ precipitate. It was found that centrifuging was superior in removing the chromium hydroxide particles, which results from the very fine, nearly colloidal size of the $Cr(OH)_3$ particles which are formed.

The settlement rate of the $Cr(OH)_3$ precipitate was also measured and found to be very slow, especially at lower temperatures. A significant improvement in settlement rate was observed at higher temperatures and at higher levels of sodium hydroxide.

The results of the sedimentation experiments are reproduced in the following Table III:

TABLE III

| HOURS FOR SETTLING | 25° C. % VOLUME OF SETTLED SOLIDS | 50° C. % VOLUME OF SETTLED SOLIDS |
|---|---|---|
| 0.00 | 100 | 100 |
| 0.83 | — | 88 |
| 1.00 | — | 75 |
| 1.50 | 92 | — |
| 2.00 | — | 59 |
| 3.50 | — | 51 |
| 3.83 | 84 | — |
| 5.33 | 64 | — |
| 24.00 | 44 | 33 |

The observed sedimentation was slow even under the most favourable conditions. The final volume of solution after separation of precipitate was slightly higher, if the process was conducted at higher temperature and higher NaOH content (93% and 91% of the initial volume for 50° and 25° C. respectively).

These results indicate that the amount of water incorporated into the precipitate depends on the temperature and amount of caustic present. The removal of water by the precipitate also was reflected in the slight increase in concentrations of both $NaClO_3$ and NaCl in the filtrate (see Table I).

SUMMARY OF DISCLOSURE

In summary of this disclosure, the present invention provides a novel method of rapidly, efficiently and effectively removing soluble hexavalent chromium from aqueous chlorate solutions, notably sodium dichromate from cell liquor, in the form of solid trivalent chromium hydroxide. The method employs a critical mole ratio of hydroxyl ions to dichromate ions in the aqueous chlorate solution and a dithionite, notably sodium dithionite, to effect the reduction in alkaline medium. Modifications are possible within the scope of the invention.

What I claim is:

1. A method for the removal of hexavalent chromium from an aqueous chlorate solution as a trivalent chromium hydroxide precipitate, which comprises:
    (a) adding to said aqueous chlorate solution at least sufficient hydroxyl ions to provide alkaline pH conditions which are maintained through the subsequent steps of the method and an effective mole ratio of $OH^-:Cr_2O_7^=$ of at least about 3:1 so as to permit Cr(III) to form $Cr(OH)_3$,
    (b) adding a dithionite to said aqueous chlorate solution to reduce Cr(VI) to Cr(III) under said alkaline pH conditions and to cause precipitation of $Cr(OH)_3$, and
    (c) separating the precipitated $Cr(OH)_3$ from said aqueous chlorate solution.

2. The method of claim 1 wherein said addition of hydroxyl ions and said addition of dithionite to said aqueous chlorate solution are effected sequentially.

3. The method of claim 2 wherein said addition of hydroxyl ions to said aqueous chlorate solution is in a quantity sufficient to produce a mole ratio of $OH^-:Cr_2O_7^{32}$ of no more than about 6:1.

4. The method of claim 2 wherein said addition of hydroxyl ions to said aqueous chlorate solution is in a quantity sufficient to produce a mole ratio of $OH^-:Cr_2O_7^=$ of from about 3:1 to about 5:1.

5. The method of claim 2 wherein said addition of a dithionite to said aqueous chlorate solution is in a quantity sufficient to provide a mole ratio of $S_2O_4^=:Cr_2O_7^=$ of at least about 3.0:1.

6. The method of claim 5 wherein said addition of a dithionite to said aqueous chlorate solution is in a quantity sufficient to provide a mole ratio of $S_2O_4^=:Cr_2O_7^=$ of approximately 3:1.

7. The method of claim 6 wherein said addition of hydroxyl ions to said aqueous chlorate solution is in a quantity sufficient to provide a mole ratio of $OH^-:Cr_2O_7^=$ of about 3:1 to about 5:1.

8. The method of claim 1 wherein said separation of precipitated $Cr(OH)_3$ is effected at least partially by centrifugation.

9. The method of claim 8 wherein said addition of at least sufficient hydroxide ion to said aqueous chlorate solution is effected to provide a pH of about 8 to 9 following said addition of dithionite to said aqueous chlorate solution.

10. The method of claim 7 wherein said addition of hydroxyl ion is effected to provide a pH of about 8 to 9 following said addition of dithionite to said aqueous chlorate solution.

11. The method of claim 10 wherein, following said addition of dithionite and formation of chromium hydroxide, sulfite ions produced by said reduction and any residual dithionite ions in said aqueous chlorate solution are oxidized, at least partially, to sulphate ions.

12. The method of claim 11 wherein said separation of precipitated chromium hydroxide is effected by centrifugation of said aqueous chlorate solution to sediment said chromium hydroxide and removing the supernatant hexavalent chromium depleted liquor from the sedimented solid phase chromium hydroxide.

13. The method of claim 12 wherein said centrifugation is effected following said oxidation of sulfite ions and dithionite ions in said aqueous chlorate solution.

14. The method of claim 1 wherein said aqueous chlorate solution is an aqueous sodium chlorate solution.

15. The method of claim 14 wherein said aqueous sodium chlorate solution is an aqueous solution of sodium chlorate and sodium chloride produced by electrolysis of an aqueous sodium chloride solution.

16. The method of claim 15 wherein said hexavalent chromate ions are provided by sodium dichromate added to said aqueous sodium chloride solution prior to said electrolysis.

17. The method of claim 7 wherein said aqueous chlorate solution is an aqueous solution of sodium chlorate and sodium chloride containing about 100 to about 750 gpl $NaClO_3$ and about 20 to about 400 gpl NaCl and produced by electrolysis of an aqueous solution of sodium chloride and wherein said hexavalent chromate is provided by sodium dichromate added to said aqueous sodium chloride solution prior to said electrolysis.

18. The method of claim 17 wherein said aqueous chlorate solution is an aqueous solution of sodium chlorate and sodium chloride containing about 250 to about 675 gpl $NaClO_3$ and about 50 to about 300 gpl Nacl.

19. The method of claim 12 wherein said aqueous chlorate solution is an aqueous solution of sodium chlorate and sodium chloride containing about 250 to about 675 gpl $NaClO_3$ and about 100 to about 300 gpl NaCl and produced by electrolysis of an aqueous solution of sodium chloride and wherein said hexavalent chromium is provided by sodium dichromate added to said aqueous sodium chloride solution prior to said electrolysis.

20. The method of claim 17 wherein said sodium dichromate is present in said sodium chloride solution in an amount of about 0.1 to about 20.0 gpl.

21. The method of claim 18 wherein said sodium dichromate is present in said sodium chloride solution in an amount of about 0.2 to about 10.0 gpl.

22. The method of claim 19 wherein said sodium dichromate is present in said sodium chloride solution in an amount of about 0.2 to about 10.0 gpl.

23. The method of claim 1 wherein said dithionite is sodium dithionite and is added to the aqueous chlorate solution as a powdered solid.

24. The method of claim 6 wherein said dithionite is sodium dithionite and is added to the aqueous chlorate solution as a powdered solid.

25. The method of claim 20 wherein said hydroxyl ions are provided by sodium hydroxide, said dithionite is sodium dithionite, said sodium dithionite is added to the aqueous chlorate solution as a powdered solid, and said powdered solid is stirred into the aqueous chlorate solution.

26. The method of claim 21 wherein said hydroxyl ions are provided by sodium hydroxide, said dithionite is sodium dithionite, said sodium dithionite is added to the aqueous chlorate solution as a powdered solid, and said powdered solid is stirred into the aqueous chlorate solution.

27. The method of claim 22 wherein said hydroxyl ions are provided by sodium hydroxide, said dithionite is sodium dithionite, said sodium dithionite is added to the aqueous chlorate solution as a powdered solid, and said powdered solid is stirred into the aqueous chlorate solution.

28. The method of claim 1 wherein said hydroxyl ions are provided by sodium hydroxide.

29. The method of claim 7 wherein said hydroxyl ions are provided by sodium hydroxide.

30. The method of claim 23 wherein said hydroxyl ions are provided by sodium hydroxide.

31. The method of claim 24 wherein said hydroxyl ions are provided by sodium hydroxide.

32. A method of removal of sodium dichromate from an aqueous solution of sodium chlorate and sodium chloride which is produced by the electrolysis of an aqueous sodium chloride solution in the presence of said sodium dichromate, which comprises the sequential steps of:
  (a) determining the sodium dichromate content of said aqueous solution of sodium chlorate and sodium chloride;
  (b) adding sodium hydroxide solution to said aqueous solution of sodium chlorate and sodium chloride to provide an effective mole ratio of $NaOH:Na_2Cr_2O_7$ of at least about 3:1;
  (c) adding solid powdered sodium dithionite to said aqueous solution of sodium chlorate and sodium chloride to provide a mole ratio of $Na_2S_2O_4:Na_2Cr_2O_7$ of at least about 3:1;
  (d) stirring in said sodium dithionite to form a blue-green precipitate of chromium hydroxide with the consumption of hydroxyl ions resulting in a pH in the range of about 8 to 9;
  (e) centrifuging the stirred solution to sediment the chromium hydroxide from the solution; and
  (f) separating the sedimented chromium hydroxide from the mother liquor.

33. The method of claim 32 wherein said mole ratio of $NaOH:Na_2Cr_2O_7$ is less than about 6:1.

34. The method of claim 33 wherein said mole ratio of $NaOH:Na_2Cr_2O_7$ is about 3:1 to about 5:1.

35. The method of claim 34 wherein said mole ratio of $Na_2S_2O_4:Na_2Cr_2O_7$ is approximately 3:1.

36. The method of claim 34 wherein said aqueous solution of sodium chlorate and sodium chloride contains about 100 to about 750 gpl $NaClO_3$ and about 20 to about 400 gpl NaCl.

37. The method of claim 36 wherein said aqueous solution of sodium chlorate and sodium chloride contains about 250 to about 675 gpl $NaClO_3$ and about 100 to about 300 gpl NaCl.

38. The method of claim 36 wherein said sodium dichromate is present in the aqueous solution of sodium chloride in an amount of about 0.1 to about 20.0 gpl of sodium chloride soluion.

39. The method of claim 37 wherein said sodium dichromate is present in the aqueous solution of sodium chloride in an amount of about 0.2 to about 10.0 gpl of sodium chloride solution.

40. The method of claim 32, including the additional step of:
  (g) oxidizing the sodium hydroxide- and sodium dithionite-treated solution to convert produced sulfite ions and any excess dithionite ions to sulfate ions.

41. The method of claim 40, wherein said oxidizing is effected by bubbling air or oxygen through the solution resulting from step (d) for about 10 to 20 minutes.

* * * * *